FIG. 3
FIG. 2
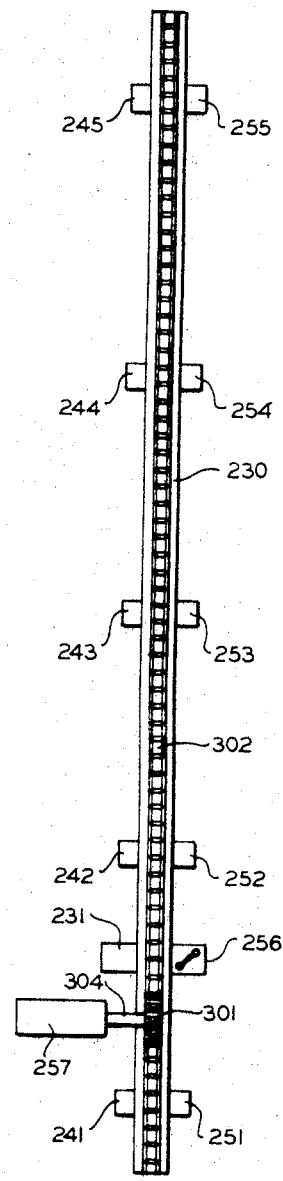
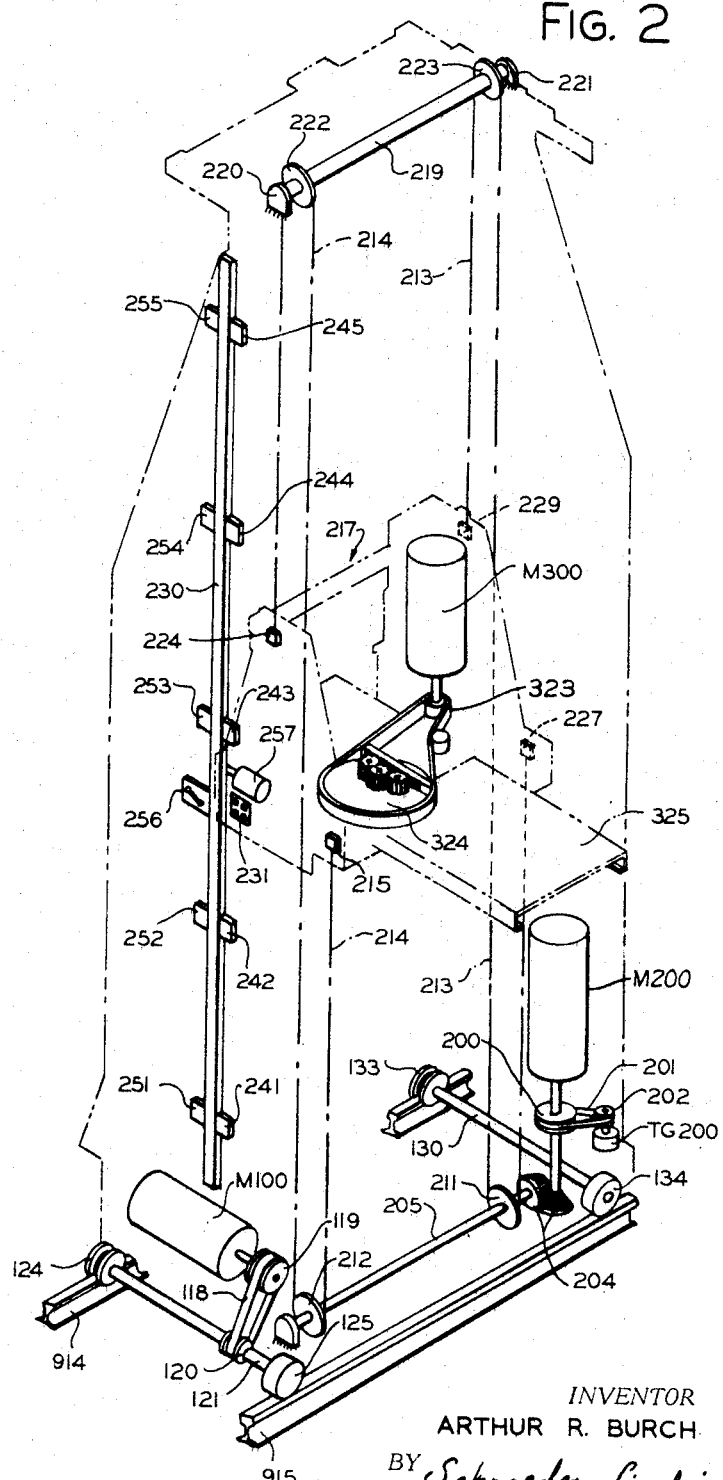
INVENTOR
ARTHUR R. BURCH
BY Schroeder, Siegfried & Ryan
ATTORNEYS INVENTOR
ARTHUR R. BURCH
BY Schroeder, Siegfried & Ryan
ATTORNEYS

United States Patent Office 3,428,149
Patented Feb. 18, 1969

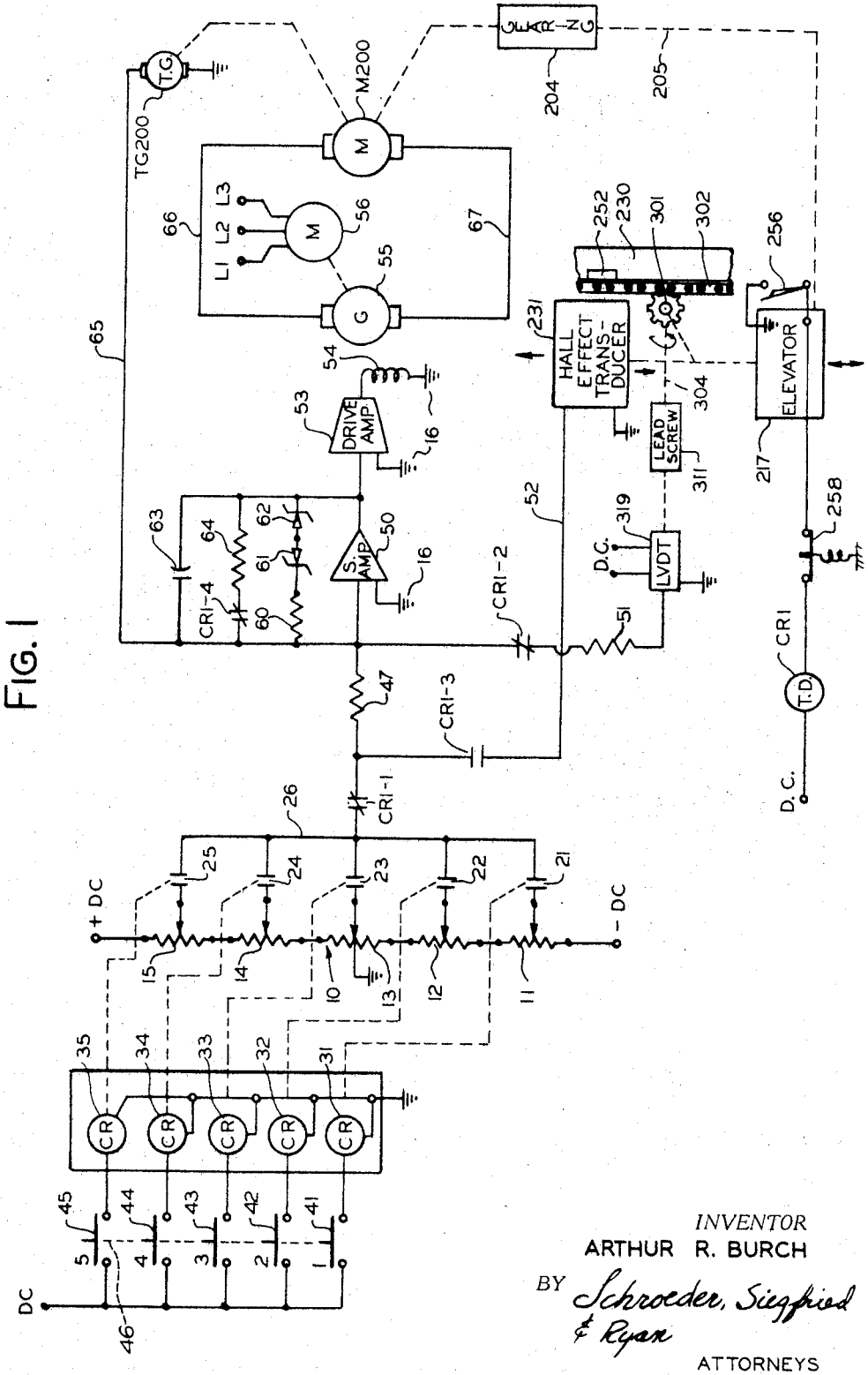

3,428,149
CONTROL APPARATUS FOR MATERIAL-UNIT STACKER
Arthur R. Burch, Wayzata, Minn., assignor to Declark, Inc., a corporation of Delaware
Filed Sept. 19, 1966, Ser. No. 580,536
U.S. Cl. 187—29       13 Claims
Int. Cl. B66b 1/36, 3/02

This invention relates to automatically controlled warehousing equipment and particularly to a stacker vehicle for moving a material load from one place to another.

As described in my co-pending applications, Ser. No. 543,224, filed Apr. 18, 1966, entitled, "Automatic Warehousing Method and Means," and Ser. No. 543,229, filed Apr. 18, 1966, entitled, "Automatic Material-Unit Storage and Method," and assigned to the same assignee, certain control systems were shown and described for the control of the stacker vehicle. While the control circuits generally operate in a satisfactory manner, it has been found that there are instances where a stacker may approach a particular bin number through the use of the coincidence circuit and if the control relays switching the control circuits from a "coarse" mode of operation to a "fine" mode of operation should have a more than normal lag in the time required to be energized, it is possible for the stacker vehicle to continue on towards other stations or bins without switching to the fine mode of operation. When such a situation does occur, the control circuit becomes somewhat "senseless" in that it does not recognize the general position of the stacker vehicle and it may then continue on its prescribed path of travel until a safety device is actuated to stop the stacker. By way of illustration, the longitudinal control system was just described and of course a similar situation may occur in the vertical mode of operation, especially when the elevator of the stacker is moving from a higher bin location to a lower bin location.

The present invention is directed primarily to automatically controlling the position of the elevator and of the stacker in a longitudinal manner. Primarily, the present invention is shown and described in controlling relationship with the elevator vehicle on the stacker as it moves vertically. This invention is directed to a means and method of locating the elevator platform within an inch or two of the final position, at which time a second transducer is used to position the elevator at exactly the correct height by "reading" a magnet located on the particular bin or a vertical upright on the stacker itself. The servo operation is changed by adding an integrator circuit to the motor control circuit in the final phase of the operation.

It is therefore a general object of this invention to provide an improved means and method for controlling a vehicle while locating the vehicle in confronting relationship with a pick-up and loading station.

It is yet another object of this invention to provide vehicle control means and a method of control in which the actual stand-off error of the vehicle with respect to a pickup and loading station is integrated to control the vehicle.

It is still a further object of this invention to provide an improved means and method of adjusting the position of the vehicle with respect to the pick-up and load station for a more accurate "spotting" of the vehicle.

It is still another object of the present invention to provide an improved means for controlling a vehicle over a predetermined path by using a linear voltage differential transformer to provide signals representative of the position of the vehicle with respect to a reference.

These and other objects and advantages of my invention will more fully appear from the following description, made in connection with the accompanying drawings, wherein like reference characters refer to the same or similar parts throughout the several views, and in which:

FIG. 1 is an electrical schematic diagram of the control circuit showing the basic operation of the same;

FIG. 2 is a diagrammatic view of a material-unit stacker showing the placement of the control elements and driving components;

FIG. 3 is an elevational front view of a mast on the stacker showing the relative position of the control elements associated with the mast;

Figure 4:
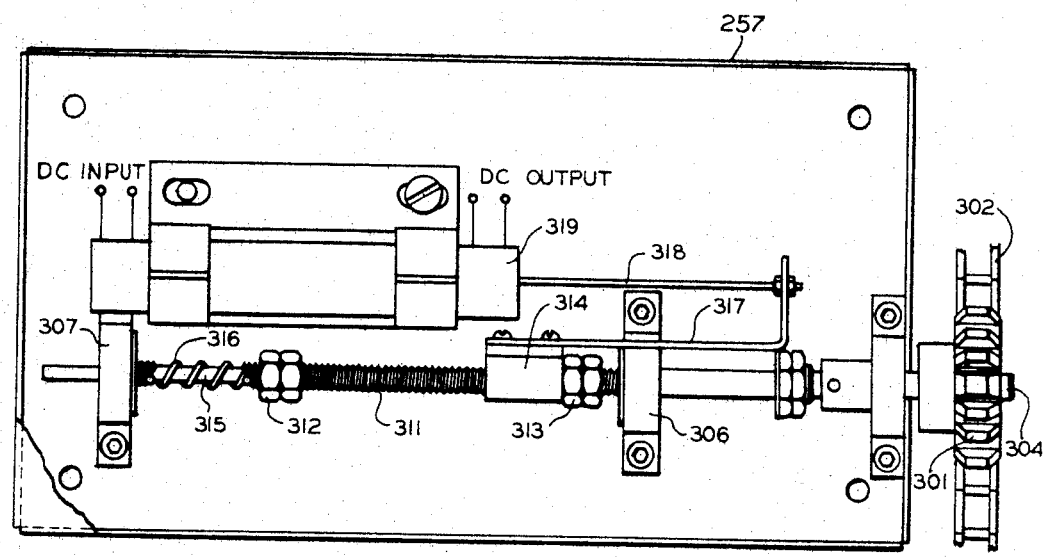
FIG. 4 is a mechanical plan view of a linear voltage differential transformer as used in the present invention.

Referring now to FIG. 2 and generally to the diagrammatic view of the stacker, there is shown a longitudinal drive motor M–100 which is secured to a lower section of the stacker. The output of motor M–100 is transferred to a timing belt 118 through a pulley 119 connected to the motor shaft. Timing belt 118 engages another pulley 120 which is secured to a shaft 121 journalled in a pair of bearings (not shown). A flanged driving wheel 124 is connected to shaft 121 on the left side and engages rail 914 while on the right hand side, a wheel 125 engages a rail 915. On the forward end of the stacker is found a shaft 130 journalled in a pair of bearings (not shown) and shaft 130 is connected to a flanged driving wheel 133 on the left side and to another wheel 134 on the right side. Flanged wheel 133 engages rail 914 and wheel 134 engages rail 915. Situated near the forward end of the stacker, is a vertical drive motor M–200 which is coupled through its shaft to a pulley 200 which drives a tachometer generator TG–200 through a belt 201 and pulley 202 connected to the tachometer generator shaft. The shaft of vertical drive motor M–200 is connected to a right angled gear box 204 in the form of a pair of bevelled gears, the gear box having a shaft 205 connected thereto which is journalled in a pair of bearings (not shown).

Secured to shaft 205, is a pair of sprockets 211 and 212 over which pass a pair of chains 213 and 214 respectively. Chain 214 is fastened to a lug 215 on the rearward side of an elevator 217 by suitable means such as a clamp or machine screws. The most centrally located portion of chain 214 passes upwardly from under sprocket 212 where it extends to the uppermost portion of the stacker. At the top of the stacker, a shaft 219 is journalled in a pair of bearings 220 and 221 and are secured to the upper portion of the stacker. Secured to shaft 219, is a pair of sprockets 222 and 223 where chain 214 passes over the top of sprocket 222 and downwardly along the center line of the stacker and is connected to another lug 224 secured to the rearward side of elevator 217 by suitable means such as that described. In a similar manner, chain 213 is secured to a forward portion of elevator 217 by securing the cable to a lug 227. Chain 213 is passed over the top of sprocket 223 and downwardly along the center line of the stacker and is connected to another lug 229 secured to an upper portion of elevator 217, by suitable means such as just described.

Situated on elevator 217, is a motor M–300. Motor M–300 drives a belt 323 which is connected to a large pulley 324 to supply power to a plurality of gears and a rack and pinion arrangement to cause a platform 325 to be driven outwardly on either side of the elevator to accomplish a pick-up or deposit mode of operation. For a more complete explanation of the lateral movement of platform 325, reference may be made to my co-pending applications.

Secured to the rearward side of the stacker, is a mast 230 which is in confronting relationship with a Hall effect type transducer 231 which senses a plurality of magnetic strips 241 through 245 which represent bin levels 1 through 5 for this particular embodiment. In other words, as the elevator moves transducer 231 past magnetic strips 241 through 245, they will be in a position to be sensed by transducer 231. For a more detailed explanation of the operation of transducer 231, reference may be had to a co-pending application entitled "Transducer," filed in the name of William B. Walton, Ser. No. 514,556, on Dec. 17, 1965, and assigned to the same assignee.

Situated on the other side of mast 230 are a plurality of magnetic elements 251 through 255 which are opposite elements 241 through 245 respectively. Secured to elevator 217 is a magnetically actuated switch 256 which is in confronting relationship with magnetic elements 251 through 255 when elevator 217 moves vertically with respect to mast 230. A linear voltage differential transformer (LVDT) 257 is driven through a shaft 304 which is coupled to a gear 301 which is in communication with a chain 302 that is secured to mast 230 by suitable means such as welding or machine screws.

Figure 5:
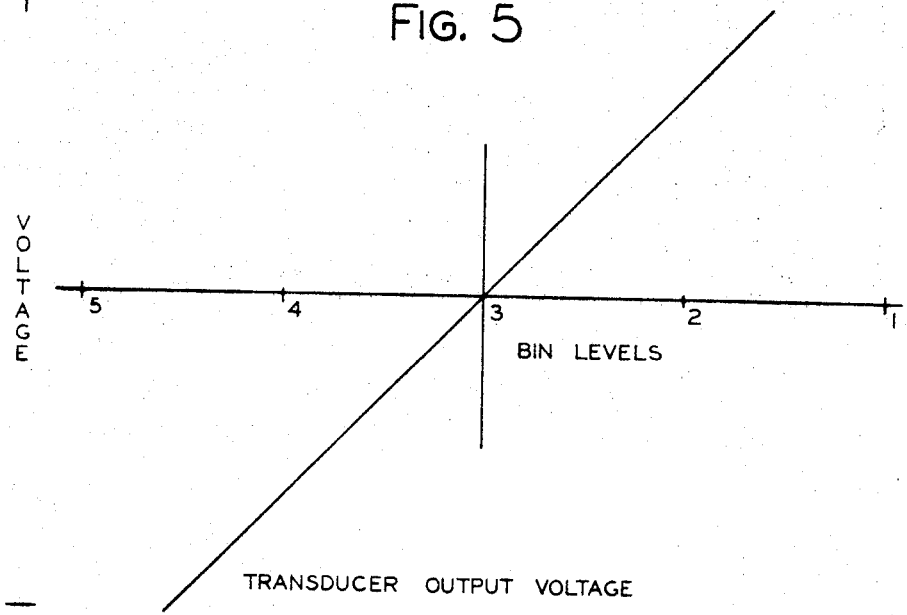
FIG. 5 is a typical voltage vs. displacement diagram of a linear voltage differential transformer.

Reference is now made to FIG. 4 where the transducer is shown in more detail, and has shaft 304 fixed between bearing blocks 306 and 307 and has lead screw threads 311 formed therein with a stop 312 connected near bearing block 307 and another stop 313 fastened to threads 311 near bearing block 306. To prevent any backlash in the lead screw arrangement, a shaft 315 is slidably secured in bearing block 307 and fixed to lead screw follower 314 below lead screw 311. Encompassing shaft 315, is a spring 316 that keeps a compression force on lead screw follower 314 as the lead screw follower moves back and forth between stops 312 and 313. Secured to lead screw follower 314, is an arm 317 which has a right angled portion formed at the end thereof. A transducer unit 319, that is the element forming the linear voltage differential transformer (LVDT), may be of the type manufactured by the Sanborn Company such as model 24DCDT–3000 which has a output of plus or minus 13 volts for a stroke of plus or minus 3 inches. The linear voltage differential transformer works much like a variable resistor, while having a direct current input and providing a direct current output which is variable with a movable member (contained within the unit) that is connected to arm 317 by a pin 318. Thus the output of transducer 257 varies with the vertical position of the elevator with respect to mast 230 as it is moved in a vertical direction. FIG. 5 shows a curve of the voltage as a function of the displacement of pin or arm 318. It will be noted that it is a linear sloping curve.

The electrical circuit is shown primarily in FIG. 1 wherein a voltage divider 10 is formed of five variable resistances 11 through 15, the resistance elements of which are connected in series and a ground voltage reference 16 is connected at the mid-point of resistance 13 across the series connected resistances. The wiper arm of each variable resistance is connected to one terminal of a set of relay contacts 21 through 25 respectively. The other terminal of the contacts are connected together through a common lead 26. The relay contacts are energized by five control relays 31 through 35 respectively which have one of their terminals connected to ground 16. A plurality of push button switches 41 through 45 have one terminal connected to relays 31 through 35 respectively and are interconnected through a mechanical linkage 46 so that only one push button switch may be closed at one time and remains closed until the next switch push button is depressed. The other terminal of switches 41 through 45 is connected to a direct current voltage source. For some applications, it may not be necessary to use relays 31 through 35 and switches 41 through 45 may take the place of contacts 21 through 25 respectively.

A control relay CR–1 is connected to a direct current source of voltage and to one terminal of reed switch 256 through a spring loaded switch 257. Switch 258 is opened each time it is desired to change the vertical position of elevator 217. The other terminal of reed switch 256 is connected to ground 16. Control relay CR–1 has a time delay element connected therein such that the relay upon being energized through the closing of switch 256 does not cause its contacts to be closed or opened until a certain time delay has taken place such as approximately one to two seconds. The reason for the time delay will be further explained in the operation of the electrical circuit. A summing amplifier 50 is connected to ground reference 16 and has an input connected to common lead 26 through a pair of normally closed relay contacts CR1–1 and a resistor 47. Also connected to the input of summing amplifier 50, is the output from transducer 319 through a pair of normally closed relay contacts CR1–2 and a resistor 51. Transducer 231 which is moved vertically by elevator 217, has its output applied to the junction between relay contacts CR1–1 and resistor 47 through a pair of normally open relay contacts CR1–3 and a connecting lead 52. The output of summing amplifier 50 is applied to a driving amplifier 53 which is connected to the field coils 54 of a generator 55 driven by a direct coupled alternating current motor 56 in the normal manner of a motor-generator set. The other terminal of field coil 54 is connected to ground 16 as is driving amplifier 53. Summing amplifier 50 has a voltage limiting network connected between its output and input in the form of a resistor 60 and a pair of back-to-back Zener diodes 61 and 62, all of which are connected in series with each other. Also connected across summing amplifier 50 between its output and input, is an integrating capacitor 63 which has connected in parallel therewith, a discharge resistor 64 and a pair of normally closed relay contacts CR1–4. Tachometer generator TG–200 has its output connected to the input of summing amplifier 50 through a connecting wire 65. Generator 55 is directly connected to motor M–200 through a pair of connecting leads 66 and 67.

OPERATION

It will be assumed that the last designation for vertical control of elevator 217 was to direct the elevator to bin level number 1 and therefore switch 41 would be depressed, control relay CR–1 would not be energized having performed the last required operation and elevator 217 would be physically located at bin level number 1. Also, transducer 319 (LVDT) would be physically driven to a position where the voltage output was equal and opposite of that provided by voltage bridge 10 through the closing of push button switch 41.

Assuming that it is desirable to cause the elevator to move from bin level number 1 to bin level number 5, push button switch 45 is depressed which opens switch 41 causing relay contacts 21 to be opened. Closing switch 45 causes contacts 25 to be closed through control relay CR–35 and thus there will be applied a voltage in a positive polarity with respect to ground 16 to summing amplifier 50 through resistor 51 when the actuate switch 258 is opened. On the other hand, transducer 319 which was last driven in a manner to supply a voltage of opposite polarity now produces a voltage of the same polarity as that of the voltage divider 10 and thus the signals are summed and amplified through summing amplifier 50. Since it may be desirable to limit the rate of travel of elevator 217, voltage clamping Zener diodes 61 and 62 provide a clamping action to the signal and thus limit its magnitude so that driving amplifier 53 is limited in its output signal to field winding 54. As elevator 217 moves upwardly, gear 301 is rotated against chain 302 which turns lead screw 311 and thus causes transducer 319 to reduce the magnitude of its voltage. As elevator 217 continues to drive, it first encounters position number 2 where switch 256 is temporarily closed by magnetic element 252 but since the signal being applied to driving amplifier 53 is of such a large magnitude, the elevator is driven past the magnetic element in a very short period of time and the time delay factor in control relay CR-1 prevents its relay contacts from changing their state of operation while switch 256 and magnetic element 252 confront each other. After moving past the magnetic element, reed switch 256 is again opened and there is no interruption in summing the error signal. Elevator 217 continues to move vertically upward and as it approaches bin level No. 5, it will be apparent that the signal from transducer 319 has now approached an equal and opposite condition such that the signal being applied to summing amplifier 50 is very small causing the signal to driving amplifier 53 to also be relatively small thus slowing down motor M-200 and the movement of elevator 217. As switch 256 approaches magnetic element 255, switch 256 is closed and since the elevator is moving slow enough for the switch to remain energized during the time delay period for control relay CR-1, control relay CR-1 is energized. Upon energizing control relay CR-1, voltage divider 10 is removed from the circuit to the input of summing amplifier 50 by opening relay contacts CR1-1 and the output from the LVDT transducer 319 is removed from the input of summing amplifier 50 by opening relay contacts CR1-2. In line 52, relay contacts CR1-3 are closed which supplies a stand-off error signal from transducer 231 to the input of summing amplifier 50. Transducer 231 senses the direction and distance from magnetic element 245 and supplies the error signal to summing amplifier 50. The output of summing amplifier 50 is applied to an integrating capacitor 63 which is no longer shunted by resistor 64 due to relay contacts CR1-4 being open and thus the stand-off error is integrated and the signal from summing amplifier 50 continues to increase until such time as sufficient current is applied to field winding 54 to cause motor M-200 to move and thus move elevator 217 and transducer 231 secured thereto. When the stand-off error signal is driven to zero, elevator 217 should be properly located in front of the bins and lateral platform 325 may be used to pickup or deposit a material-unit.

When it is again desirable to move the elevator from the fifth bin level to one which is lower, then another switch is selected, subsequent to depression spring loaded switch 258 which causes the circuit to control relay CR-1 to be temporarily broken thus allowing control relay CR-1 to return to its de-energized position and again supply signals to summing amplifier 50 from voltage bridge 10 and transducer 319. It will also be noted that upon closing relay contacts CR1-4, capacitor 63 is thus discharged through resistor 64 which then reduces the signal representative of any stand-off error to zero value to provide a proper stand-off signal level at the next bin location which is sensed by transducer 231.

It should also be apparent that the same driving system may be used for longitudinal control by substituting motor M-100 for motor M-200 along with the appropriate gearing, in the circuit as shown in FIG. 1. Instead of having the chain 302 positioned along a vertical mast, the chain is secured to the floor along side the tracks 914 and 915 so that gear 301 would be driven in controlling relationship and provide a voltage from transducer 319 representative of the longitudinal location of the stacker with respect to the aisle. Magnetic elements such as 251 through 255 are located at each longitudinal bin position as are elements such as 241 through 245 to perform their appropriate functions. Those other cooperating elements, such as transducer 231 and switch 256 will also be relocated and the control switches such as switches 41 through 45 would take on a different representation of bin location.

It will, of course, be understood that various changes may be made in the form, details, arrangement and proportions of the parts without departing from the scope of my invention which consists of the matter shown and described herein and set forth in the appended claims.

What is claimed is:
1. Apparatus for the control of a material handling vehicle comprising:
 (a) a vehicle adapted to travel over a predetermined path of travel and carry material-units, said path of travel having a plurality of stations along said path of travel;
 (b) driving means operably connected to said vehicle for causing movement thereof along said predetermined path of travel;
 (c) signal summing means operably connected to said driving means;
 (d) voltage divider means having taps to provide voltages of different magnitude with respect to a common reference, said taps being representative of different stations along said predetermined path of travel;
 (e) control means controllable by an operator for selectively determining one of said taps;
 (f) linear voltage signal generator means providing a voltage having a polarity opposite that of said voltage divider means and being connected to said driving means to produce a linear voltage of magnitude equal to that of said voltage divider means and also representative of the position of said vehicle along said predetermined path of travel;
 (g) proximity sensing means sensing the proximity of said vehicle with respect to the station selected by one of said taps and generating an error signal representative of the position difference;
 (h) integrator means for integrating said position error signal and providing an output signal representative of said integrated signal, said integrator means being connected to the output of said signal summing means;
 (i) and station identifying means including switching means energized upon identifying each of said stations, said switching means connecting said voltage divider and said linear voltage signal generator means to the input of said signal summing means when in a first state of operation, and connecting said position sensing means and said integrator means to the input of said signal summing means when in a second state of operation in place of said means connected thereto when in said first state of operation.

2. The invention as set forth in claim 1 including:
 (j) signal limiting means connected across said signal summing means and limiting the magnitude of the output signals from said summing means to said driving means.

3. The invention as set forth in claim 1 including:
 (k) integrator disabling means connected to said integrator means through said switching means that said integrator means is disabled when said proximity sensing means is disconnected from said signal summing means.

4. The invention as set forth in claim 1 including:
 (l) tachometer generator means operably connected to said driving means and having its signal output connected to said signal summing means.

5. The invention as set forth in claim 1 wherein:
 (m) said linear voltage signal generator means includes a linear voltage differential transformer connected to said driving means through gearing, said gearing being driven by the relative motion of said vehicle over said path of travel.

6. The invention as set forth in claim 1 wherein:
 (n) said switching means includes a first part thereof located at each of said station locations and a second part thereof located on said vehicle for making or breaking the connections to said signal summing means.

7. The invention as set forth in claim 6 wherein said switching means includes:
(o) a time delay element connected to one of said first or second parts permitting said switching to make said connections to said signal summing means after a predetermined period of time has lapsed.

8. The invention as set forth in claim 1 wherein:
(p) said voltage divider means includes adjustable taps, said taps being settable to provide a reference voltage that may be varied to balance said voltage from said linear voltage signal generator when said vehicle is disposed opposite said station represented by said taps.

9. The method of controlling a material handling vehicle over a predetermined path having a number of pickup and discharge stations comprising:
(a) generating a reference voltage representative of a location of one station other than the one occupied by the vehicle;
(b) generating a voltage of opposite polarity and of a magnitude at least equal to, or greater than, that of the reference voltage for the one station location, the signal varying with the position of the vehicle from the one station;
(c) summing the two voltages to produce an error signal representative of the position of the vehicle from the one station;
(d) combining said error signal with an excitation signal to produce a driving voltage for the vehicle;
(e) switching the control of the driving voltage for the vehicle by eliminating the said error signal;
(f) sensing the proximity of the vehicle with respect to the one station and generating a signal representative of the actual distance between the vehicle and the one station;
(g) integrating the generated signal representative of the actual distance between the vehicle and the one station;
(h) and combining said signal integrated with said excitation signal to produce a second driving voltage for the vehicle, said signal integrated reaching zero value when the actual distance between the vehicle and the one station reaches zero value.

10. The invention as set forth in claim 9 including:
(i) limiting the magnitude of said error signal to limit said driving voltage magnitude.

11. The invention as set forth in claim 9 including:
(j) shifting the reference of the reference voltage generated to reduce the magnitude of said error signal to a minimum when the vehicle arrives at the one station.

12. The invention as set forth in claim 9 including:
(k) amplifying said excitation voltage and said voltage combined therewith in providing a driving voltage.

13. The invention as set forth in claim 9 including:
(l) generating a signal representative of the velocity of movement of the vehicle;
(m) combining said signal representative of the velocity of movement of the vehicle with said error signal and said signal representative of the actual distance between the vehicle and the one station, the latter signals being integrated.

References Cited

UNITED STATES PATENTS

| 2,699,226 | 1/1955 | Bruns | 187—29 |
| 3,146,857 | 9/1964 | Bosshard | 187—29 |

ORIS L. RADER, *Primary Examiner.*

W. E. DUNCANSON, *Assistant Examiner.*

U.S. Cl. X.R.

318—18